United States Patent [19]

Hattori et al.

[11] Patent Number: 4,798,561
[45] Date of Patent: Jan. 17, 1989

[54] HYDRAULIC CONTROL APPARATUS FOR STEPLESS TRANSMISSION

[75] Inventors: Katsuhiko Hattori, Nagoya; Hideyuki Suzuki; Takeo Ogasawara, both of Aichi, all of Japan

[73] Assignee: Kabushiki Kaisha Toyota Chuo Kenkyusho, Japan

[21] Appl. No.: 933,783

[22] Filed: Nov. 24, 1986

[30] Foreign Application Priority Data

Nov. 29, 1985 [JP] Japan .................... 60-269090

[51] Int. Cl.⁴ .................................. F16H 11/02
[52] U.S. Cl. ............................ 474/28; 74/867; 74/868; 474/18
[58] Field of Search ................... 474/28, 18; 74/865–869

[56] References Cited

U.S. PATENT DOCUMENTS 4,475,416 10/1984 Underwood .............. 474/28 X
4,601,681 7/1986 Costelli et al. .............. 474/28
4,669,336 6/1987 Okada et al. ............. 474/28 X

FOREIGN PATENT DOCUMENTS 104033 8/1984 European Pat. Off. .
118184 12/1984 European Pat. Off. .
139277 2/1985 European Pat. Off. .
2058256 4/1981 United Kingdom .
2158898 5/1985 United Kingdom .

*Primary Examiner*—Thuy M. Bui
*Attorney, Agent, or Firm*—Parkhurst & Oliff

[57] ABSTRACT

A hydraulic control apparatus is employed in a stepless transmission in which an endless belt is stretched between and wrapped around a pair of pulleys and the velocity ratio between input and output shafts is changed by varying the width of a groove defined in each of the pulleys. Hydraulic pressure supplied from a hydraulic pressure supply source is reduced to necessary levels by first and second adjusting apparatus, respectively, and then sent ot respective cylinder chambers of the pulleys. A controller controls the hydraulic pressure supply source on the basis of either one of the hydraulic pressures respectively reduced by the first and second adjusting apparatus which is higher than the other so that the supply source generates a hydraulic pressure which is sufficiently high to supply the higher hydraulic pressure, thus reducing loss of power in the hydraulic pressure supply source.

21 Claims, 13 Drawing Sheets

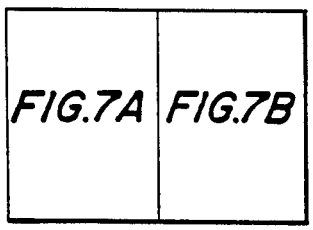
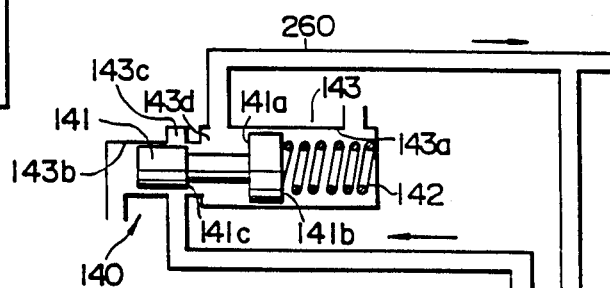
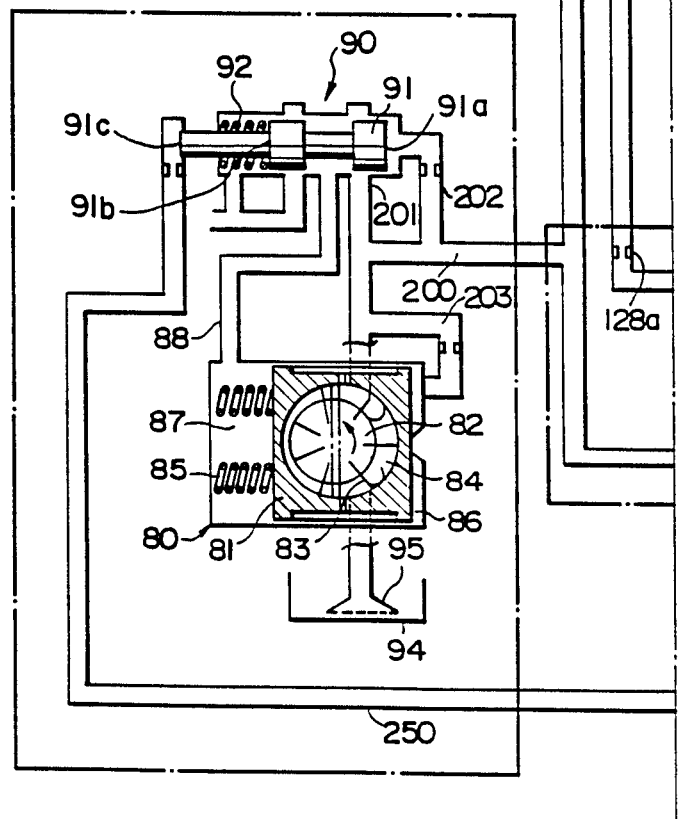

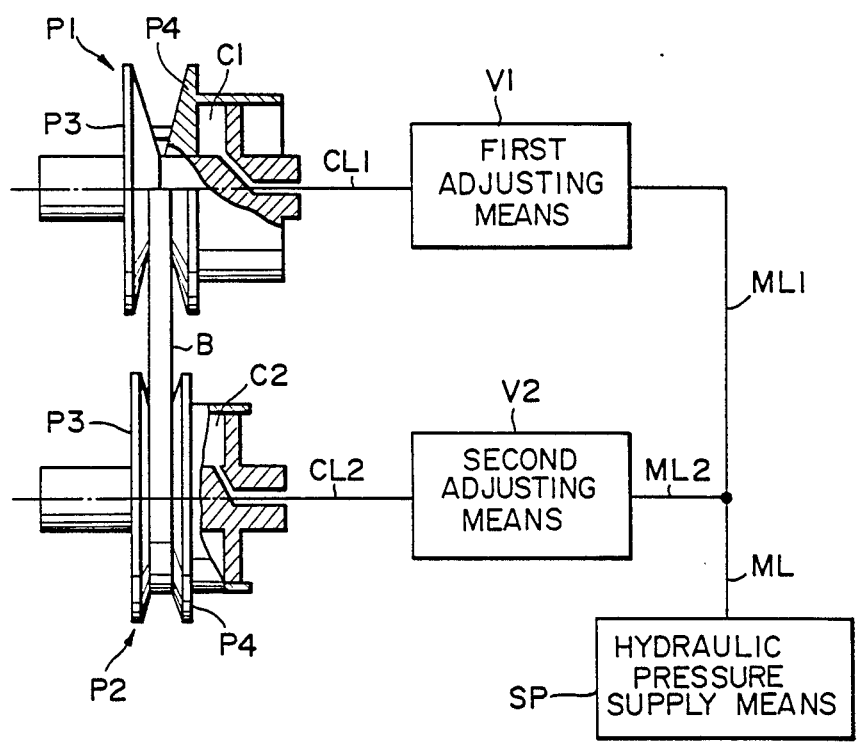

HYDRAULIC CONTROL APPARATUS FOR STEPLESS TRANSMISSION

BACKGROUND OF THE INVENTION

1. Field of the Invention

The present invention relates to a hydraulic control apparatus for controlling a stepless transmission employed in a vehicle, an industrial machine or the like.

2. Description of the Related Art

There is one type of stepless transmission as shown in FIG. 9 in which an endless belt is stretched between and wrapped around a pair of pulleys having their shafts defined as output and input shafts, respectively, and the width of a groove defined in each pulley is varied to change the radius of wrap of the belt, thereby effecting a change of rotational speed between the pulleys.

This type of stepless transmission will be explained below. A pair of transmission pulleys P1 and P2 are arranged such that cones P3 and P4 of each pulley are moved toward and away from each other in response to a change in volume of the corresponding cylinder C1 or C2, thereby allowing the radius of wrap of an endless belt B to be varied.

The width of the V-shaped groove is adjusted by a first control means V1 for controlling the hydraulic pressure in the cylinder C1 which is integral with the first transmission pulley P1, and the belt tension is controlled by a second control means V2 for adjusting the hydraulic pressure in the cylinder C2 which is integral with the second transmission pulley P2.

Oil which is supplied to a main circuit ML by a hydraulic pressure supply means SP is led to the first and second control means V1 and V2 through first and second main circuits ML1 and ML2. The supply means SP is directly coupled to and driven by a drive source which also drives the input shaft of the stepless transmission.

The pressure of contact between the belt B and the second transmission pulley P2 and the initial tension of the belt B are controlled by adjustment of the hydraulic pressure in the second cylinder C2 effected by the second control means V2. Accordingly, the hydraulic pressure in the cylinder C2 is controlled so as to be equal to or lower than the hydraulic pressure in the main circuit ML, generally as a function of the velocity ratio (i.e. rotational speed ratio). However, in the case where there is a delay in attaining a target velocity ratio, the hydraulic pressure in the second cylinder C2 may be controlled in a different way.

The velocity ratio, that is, the ratio of rotational speed of the output shaft to that of the input shaft, is controlled by the first control means V1 which adjusts the amount of oil supplied to or discharged from the cylinder C1 of the first transmission pulley P1.

The hydraulic pressure in the cylinder C1 of the first transmission pulley P1 is changed in accordance with the level of the hydraulic pressure in the cylinder C2 of the second transmission pulley P2, the output torque, the velocity ratio, and a target shift-up or shift-down speed. Therefore, the pressure in the cylinder C1 may be lower in some cases and higher in the other cases than the pressure in the second cylinder C2, and it is conventional practice to set the hydraulic pressure in the main circuit ML at a constant level which is determined by the highest pressure of those which are required for the cylinders C1 and C2.

Setting the hydraulic pressure in the main circuit ML at a constant level enables simplification of the oil hydraulic system but, at the same time, involves the following problems.

(1) Since the power consumed by the hydraulic pressure supply means SP increases substantially in proportion to the hydraulic pressure in the main circuit ML, the prior art in which the hydraulic pressure in the main circuit ML is constantly used at a relatively high level suffers a large power loss, which means that a disadvantageously large input energy may be required to obtain the same transmission output. In other words, in a vehicle which is driven by an engine, the rate of fuel consumption is increased to bring about an economical disadvantage.

(2) In addition, the bearing load in pump means (not shown) which is an element constituting the hydraulic pressure supply means SP increases in proportion to the level of the hydraulic pressure in the main circuit ML. Therefore, it is necessary to increase the volumetric capacity of the bearing from the viewpoint of the lifetime thereof, which involves a hindrance to education in size and weight of the stepless transmission. When the apparatus is employed in a vehicle or the like, the increase in the weight of the transmission leads to an increase in weight of the vehicle as a whole and hence a rise in the rate of fuel consumption, and the increase in the size of the transmission unfavorably narrows the compartment space in the vehicle, thus bringing about disadvantages in terms of economy and commercial value.

SUMMARY OF THE INVENTION

In view of the above-described circumstances, it is a primary object of the present invention to provide a hydraulic control apparatus for a stepless transmission wherein the delivery pressure of the hydraulic pressure supply means is controlled so as to be minimized to improve the transmission efficiency.

To this end, the present invention provides a hydraulic control apparatus for a stepless transmission wherein an endless belt is stretched between and wrapped around a pair of pulleys, and the width of a groove defined in each pulley for wrapping the belt is varied to effect a change of speed between the pulleys, comprising: hydraulic pressure supply means capable of varying the level of hydraulic pressure supplied therefrom; first adjusting means for adjusting the hydraulic pressure supplied from the hydraulic pressure supply means to a level required for a cylinder chamber of either one of the pair of pulleys; second adjusting means for adjusting the hydraulic pressure supplied from the hydraulic pressure supply means to a level required for a cylinder chamber of the other of the pair of pulleys; and control means for controlling the hydraulic pressure generated by the hydraulic pressure supply means on the basis of either one of the hydraulic pressures respectively adjusted by the first and second adjusting means which is higher than the other.

The above-described arrangement will be explained below with reference to FIG. 1. Hydraulic pressure is delivered from a hydraulic pressure supply means SP to first and second adjusting means V1 and V2 through main circuits ML, and first and second supply circuit ML1 and ML2 so as to be adjusted to levels which are required for pulleys P1 and P2, respectively, and these adjusted pressures are supplied to the pulleys P1 and P2 through first and second control circuits CL1 and CL2.

Accordingly, in each of the pulleys P1 and P2 the relative position between belt wrapping cones P3 and P4 is determined in response to a change in hydraulic pressure in the corresponding cylinder C1 or C2. Thus, the radius of wrap of a belt B around each of the pulleys P1 and P2 is varied to effect a change of speed.

First and second branch circuits PL1 and PL2 are respectively branched off from the first and second control circuits CL1 and CL2 to lead to a control means SV. The control means SV detects either one of the hydraulic pressures in the first and second control circuits CL1 and CL2 which is higher than the other, and transmits the detected pressure to the hydraulic pressure supply means SP through a signal pressure circuit SL. In response to this signal pressure, the supply means SP adjusts the hydraulic pressure supplied therefrom on the basis of a higher hydraulic pressure in either the first or second control circuit CL1 or CL2.

It should be noted that the first and second branch circuits PL1 and PL2 may be directly branched off from portions which are subjected to pressures equal to those in the first and second control circuits CL1 and CL2, e.g., the first and second adjusting means V1 and V2, and in this case also, similar advantages are obtained.

The hydraulic pressure in the main circuit ML is adjusted so as to be equal to or higher than the hydraulic pressure required for the cylinders C1 and C2 by the hydraulic pressure supply means SP which is activated in response to a signal pressure supplied from the control means SV. Accordingly, in contrast to the prior art wherein the pressure in the main circuit ML is controlled to a maximum pressure required for the cylinders C1 and C2, the hydraulic control apparatus according to the present invention enables the pressure in the main circuit ML to be controlled so as to be equal to or slightly higher than the pressure required for each of the cylinders C1 and C2 which changes in accordance with operating conditions such as the velocity ratio and a shift-up or shift-down speed, so that the power required for the hydraulic pressure supply means SP is generally reduced and the overall transmission efficiency is improved.

In one practical form for carrying out the present invention, the control means is provided with a selecting means whereby either one of the hydraulic pressures in the first and second branch circuits which is higher than the other is selected and led to the hydraulic pressure supply means.

In another practical form of the present invention, the hydraulic pressure supply means SP has a positive displacement type hydraulic pump which delivers hydraulic oil to the main circuit ML continuously and efficiently and a pressure regulating valve which is capable of controlling the hydraulic pressure in the main circuit ML to a level corresponding to a signal pressure from the signal pressure circuit SL by discharging or returning the surplus oil in the main circuit ML to a tank. It should be noted that the pressure regulating valve is provided in the intermediate portion of a flow passage which branches off from a flow passage providing communication between the hydraulic pump in the hydraulic pressure supply means SP and which has an open end within the tank.

The hydraulic pump, which is a constituent element of the hydraulic pressure supply means SP for controlling the hydraulic pressure in the main circuit ML, is a pump which is capable of continuously delivering oil at a flow rate higher than a maximum flow rate of oil consumed by the first and second adjusting means V1 and V2 and whose discharge rate is only slightly affected by a change in pressure in the main circuit ML, that is, a positive displacement type pump in which oil within a rigid chamber defined by a closed space is delivered by decreasing the volume of the chamber.

The pressure regulating valve, which is another constituent element of the hydraulic pressure supply means, is adapted to return any surplus oil which is not consumed by the adjusting means V1 and V2 to the tank and to control the hydraulic pressure in the main circuit ML to a level corresponding to a signal pressure supplied from the selecting means SV. More specifically, the hydraulic pressure in the main circuit ML consists of a pressure component proportional to the signal pressure and a predetermined bias pressure component and is usually maintained at a level higher than the pressures in the cylinders C1 and C2.

The second practical form of the present invention offers the following advantages. Namely, since the pressure in the main circuit ML is controlled with good response, even when the flow rate of oil consumed by the control means V1 or V2 suddenly changes, the pressure in the main circuit ML can be maintained at a substantially constant and predetermined level corresponding to a signal pressure, so that it is possible to prevent the pressure in the main circuit ML from becoming excessively high and thereby causing a damage to many constituent elements. In addition, since the delivery pressure of the hydraulic pump, which is the pressure in the main circuit, can be controlled to a minimum necessary level, the torque required to drive the pump is reduced to increase the efficiency in the drive system, which enables a reduction in the rate of fuel consumption of the engine or the rate of power consumption of an electric motor, thus increasing economical profit.

Another great advantage is that, since no electrohydraulic converter is employed in the control section for controlling the pressure in the main circuit, the number of parts can be reduced and the arrangement of the controller can be simplified, so that it is possible to reduce the production cost and lower the probability of failure. A reduction in electrical load enables minimization of both the battery and generator capacities.

In still another practical form of the present invention, the hydraulic pressure supply means SP includes a variable displacement pump which enables the amount of oil delivered per revolution of the pump shaft to be adjusted steplessly and continuously, and a displacement control means for controlling the displacement (the amount of oil delivered per revolution of the pump shaft) of the variable displacement pump so that no surplus oil is present in the main circuit ML at all times and the hydraulic pressure therein coincides with a level corresponding to a signal pressure supplied from the signal circuit SL. More specifically, the displacement control means adjusts the amount of oil supplied to or discharged from an actuator for varying the displacement of the variable displacement pump so that the pump displacement corresponds to a particular flow rate of oil consumed, thereby maintaining the pressure in the main circuit ML at the required level.

The variable displacement type hydraulic pump, which is one constituent element of the hydraulic pressure supply means, is rotated together with the input shaft of the stepless transmission in one unit, and a control pressure from the displacement control means, which is another constituent element of the supply means, is led to a control actuator which is connected to a displacement adjusting member of the pump, thereby changing the amount of oil delivered per revolution of the pump shaft.

The displacement control means is provided in the intermediate portion of a branch flow passage which is branched off from a main flow passage providing communication between the hydraulic pump and the main circuit and which is communicated with either a lubricating circuit or a low-pressure circuit, to control the hydraulic oil supplied to the control actuator.

For example, in the case where the amount of oil consumption in all hydraulic circuits decreases when a signal pressure from either the control means or the selecting means is constant, the pressure in the main circuit ML leads to an excess in the flow rate of oil delivered from the variable displacement hydraulic pump and said pressure is increased excess a target pressure. The displacement control means, therefore, changes the hydraulic pressure supplied to the control actuator so that the displacement adjusting member is moved in a direction in which the discharge rate of the pump is decreased. As a result, the discharge rate of the hydraulic pump is reduced, and the pressure in the main circuit ML is lowered to a target level. In addition, the displacement control means maintains the displacement adjusting member of the pump in this state, thus maintaining the pressure in the main circuit ML at the target pressure.

On the other hand, when a signal pressure, which is output from the control means or the selecting means to the displacement control means and which represents the pressure in either the first or second control circuit, becomes close to the pressure in the main circuit due to a change in output load of the stepless transmission, a change of speed, etc., the displacement control means quickly responds to the change in the signal pressure and changes the hydraulic pressure supplied to the control actuator in a direction in which the discharge rate of the hydraulic pump is increased. In consequence, the discharge rate of the pump is increased, and the pressure in the main circuit is raised. When the pressure in the main circuit is raised to a predetermined level, said pressure is maintained at the predetermined level by the operation of the displacement control means which changes the discharge rate of the hydraulic pump in response to a variation in the flow rate of oil consumed.

In contrast to the control system in the second practical form in which any surplus oil is returned to the tank through the lubricating circuit or the like, the control system in this practical form is adapted to directly vary the flow rate of oil delivered by the pump, thus enabling the discharge rate of the pump to be minimized.

As a result, the torque required to drive the hydraulic pump directly coupled to the input shaft of the stepless transmission is substantially equal to that for the pump in the second practical form during the greatest shifting speed change at a relatively small rotational speed but is smaller than the latter in most of the other operating conditions. This tendency is more remarkable as a shifting speed becomes lower, or as the input rotational speed becomes higher. In particular, the drive torque (power loss) is extremely small in a steady running of the transmission.

Thus, the transmission efficiency in actual use is greatly improved, and the rate of fuel consumption during the running of a vehicle is further reduced. In addition, since no discharge of unnecessary surplus oil is carried out, there is no conversion of hydraulic energy to thermal energy, so that no excessive rise in oil temperature occurs, and foaming of oil in the tank is remarkably reduced. Accordingly, in the former case it becomes unnecessary to provide an oil cooler, and it is possible to prevent occurrence of seizing due to lowering in viscosity of oil. In the latter case, the compressibility of oil sucked into the hydraulic pump is reduced to improve the control response, so that it becomes possible to effect control along an optimum fuel consumption curve, or control with good feeling.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 9 schematically shows the arrangement of a conventional hydraulic control apparatus for a stepless transmission.

DESCRIPTION OF THE PREFERRED EMBODIMENTS

Figure 1:
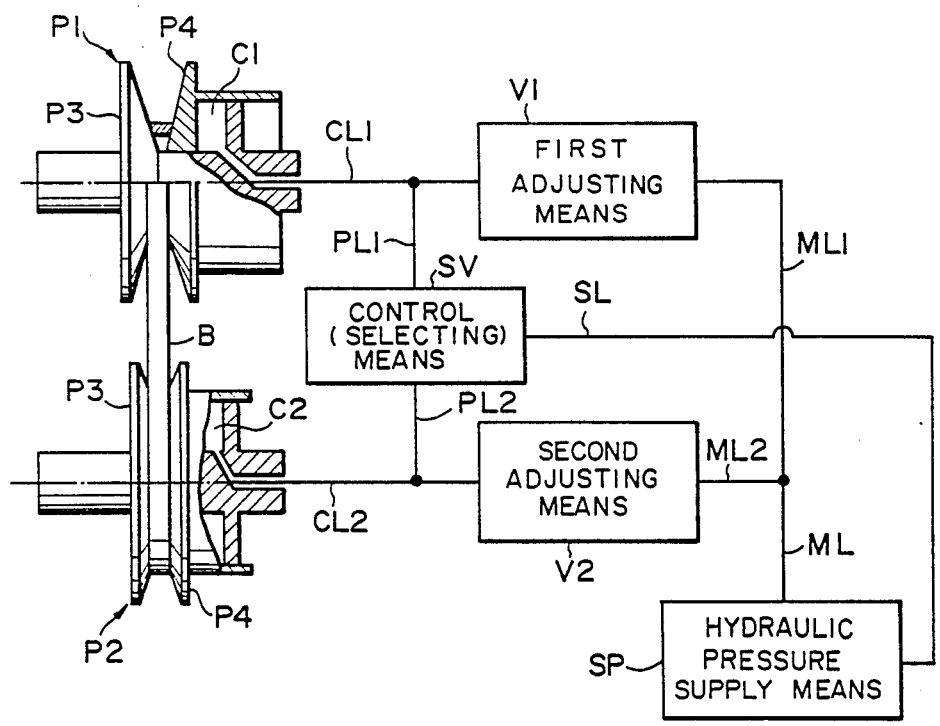
FIG. 1 schematically shows the general arrangement of the present invention.
Figure 2:
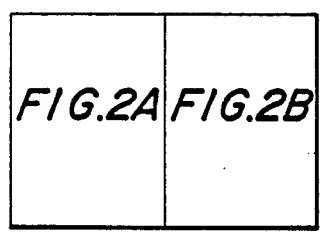
FIG. 2 (FIGS. 2A & 2B) shows the arrangement of a first embodiment of the present invention.
Figure 2A:
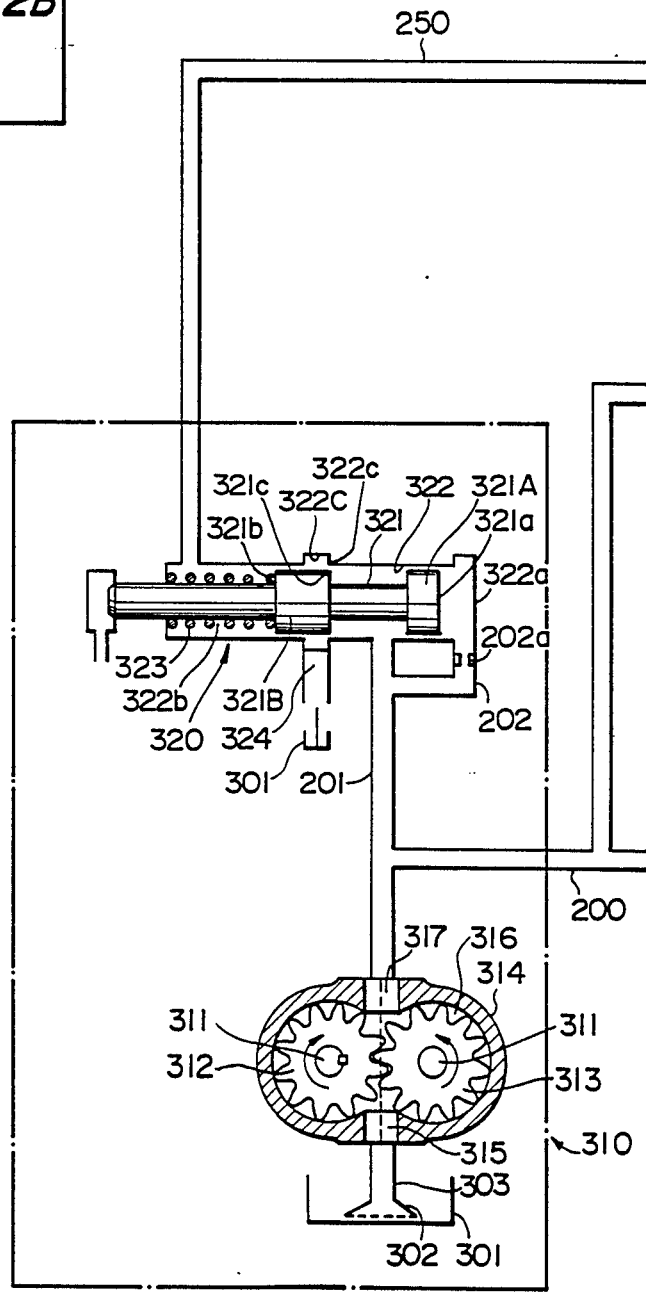
Figure 2B:
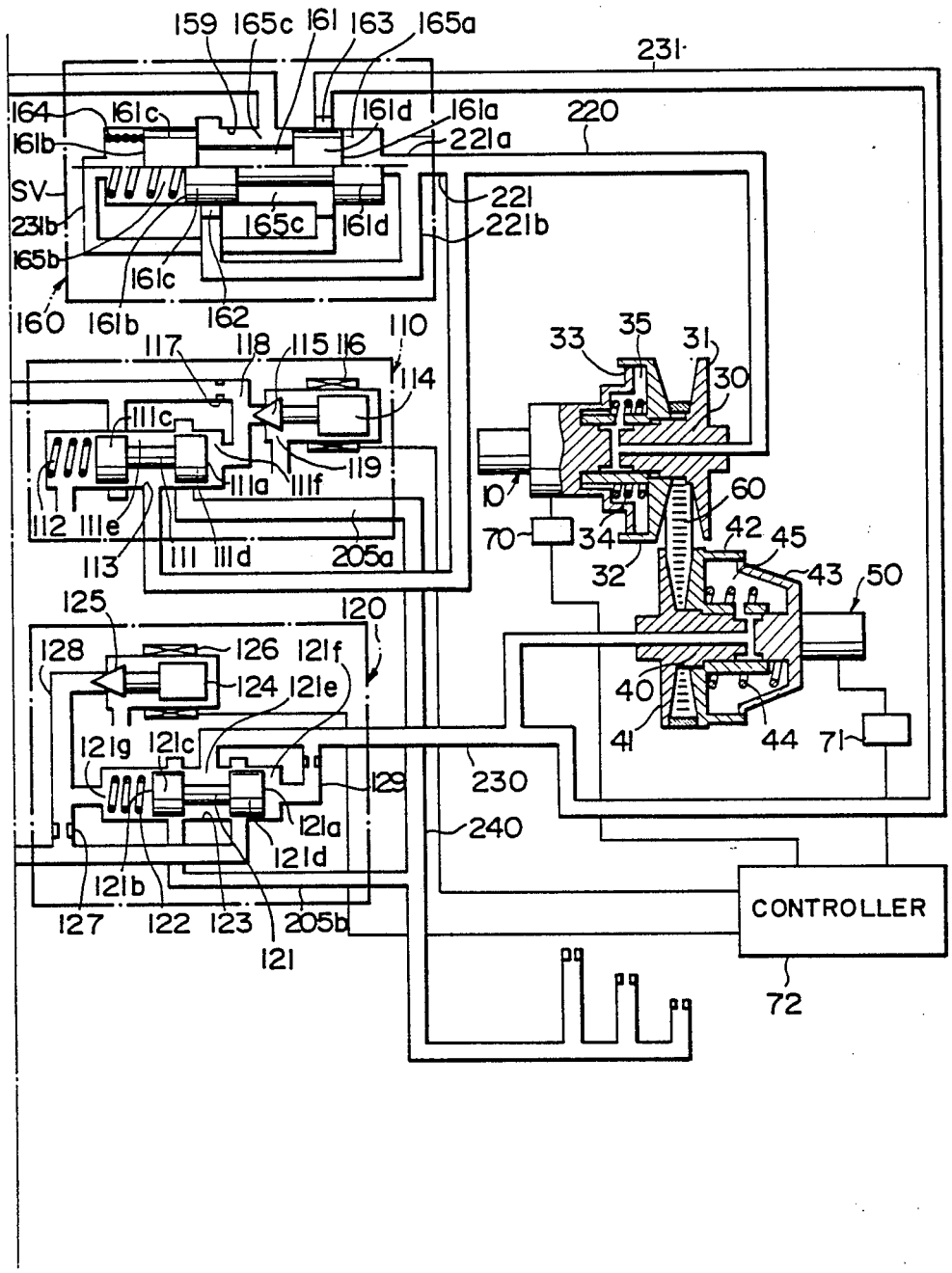

FIG. 2 shows the arrangement of a first embodiment of the present invention in which the invention is applied to a machine tool or the like. The first embodiment will be described below by way of an example in which an input shaft 10 of a stepless transmission is driven by an electric motor (not shown) at a predetermined constant rotational speed and the rotational speed of an output shaft 50 of the transmission is varied in a stepless way to control the cutting speed of a machine tool.

The input shaft 10 of this transmission has a pulley shaft 30 formed integral therewith, and a conical fixed pulley 31 is rigidly secured to the pulley shaft 30 in one unit. A movable pulley 32 is fitted on the pulley shaft 30 by means, for example, of spline coupling so that the movable pulley 32 is rotatable together with the pulley shaft 30 and also movable in the axial direction of the shaft 30.

A cylinder chamber 35 is provided between the movable pulley 32 and the input shaft 10. The cylinder chamber 35 is expanded by means of hydraulic pressure supplied thereto from a first control circuit 220, whereby it is possible to change the width of a groove defined between the fixed and movable pulleys 31 and 32. Thus, it is possible to vary the diameter of wrap of a belt 60 which is wrapped around the pair of pulleys 31 and 32.

A compression coil spring 34 is interposed within the cylinder chamber 35 to bias the movable pulley 32 in a direction in which the cylinder chamber 35 is expanded, thereby preventing the belt 60 from coming off the pulleys 31 and 32 when the supply of hydraulic pressure is accidentally stopped at the time of a power failure.

A pulley shaft 40 is rigidly secured to the output shaft 50 in a manner similar to that in the input shaft 10, and a fixed pulley 41 is rigidly secured to the pulley shaft 40 in one unit. In addition, a movable pulley 42 is adapted to be movable relative to the pulley shaft 40 only in the longitudinal direction thereof, and a cylinder chamber 45 is provided between the movable pulley 42 and the pulley shaft 40, so that the movable pulley 42 is moved toward the fixed pulley 41 by means of hydraulic pressure supplied from a second control circuit 230 thereby to permit the diameter of wrap of the belt 60 to be changed. A compression coil spring 44 is similarly disposed within the cylinder chamber 45 to bias the movable pulley 42 toward the fixed pulley 41.

The belt 60 is made of a rigid metallic material for the purpose of transmitting rotational force from the input shaft 10 to the output shaft 50, and composed of a plurality of constituent elements linked to each other so as to make the belt 60 flexible. The rotational speed transmitted to the output shaft 50 is the reciprocal of the ratio between the diameter of wrap of the belt 60 around the pair of fixed and movable pulleys 31, 32 and the diameter of wrap of the belt 60 around the pair of fixed and movable pulleys 41, 42.

Rotational speed sensors 70 and 71 are respectively attached to the input and output shafts 10 and 50 to detect the rotational speeds of the shafts 10 and 50 and transmit detected signals to a controller 72.

The first and second control circuits 220 and 230 for supplying hydraulic power to the input and output shafts 10 and 50 are supplied with hydraulic pressures from first and second adjusting means 110 and 120, respectively, which adjust the hydraulic pressure generated by a hydraulic pressure supply means 310 to levels required for the first and second control circuits 220 and 230. The pressures in the first and second control circuits 220 and 230 are detected by a control means 160 in order to control the hydraulic pressure supply means 310.

An hydraulic pump which constitutes a part of the hydraulic pressure supply means 310 is arranged such that a pair of gears 312 and 313 which are in mesh with each other are provided within a casing 314 and rigidly secured to respective pump shafts 311 which are rotatably supported by the casing 314. One of the pump shafts 311 is rotated by a motor (not shown) at a constant speed.

The casing 314 has an inlet 315 and an outlet 317 respectively provided at two sides thereof facing each other across the area of mesh between the gears 312 and 313.

The inlet 315 allows oil in a tank 301 to be sucked in through a piping 303 and a suction filter 302, the oil then being sent to the outlet 317 through oil chambers 316 defined between the gears 312, 313 and the casing 314.

One end of a main circuit 200 is communicated with the outlet 317 to deliver the oil to the first and second adjusting means 110 and 120.

A flow passage 201 is branched off from a portion of the main circuit 200 and communicated with a pressure regulating valve 320.

In the pressure regulating valve 320, a spool 321 is accommodated in a cylinder chamber 322. The spool 321 has an enlarged-diameter portion 321A provided at one end thereof and an enlarged-diameter portion 321B at the intermediate portion thereof. One end face 321a of the enlarged-diameter portion 321A defines a chamber 322a between the same and one end face of the cylinder chamber 322, the chamber 322a being communicated with the flow passage 201 via a flow passage 202. A throttle flow passage 202a is formed in the flow passage 202 to define a damper.

A corner 321c of the enlarged-diameter portion 321B faces a corner 322c of an annular groove 322C provided in the intermediate portion of the cylinder chamber 322. Accordingly, when the enlarged-diameter portion 321B moves leftward from the position shown in FIG. 2, the flow passage 201 is allowed to communicate with a flow passage 324 through the groove 322C to return the oil to the tank 301. However, when the enlarged-diameter portion 321B moves rightward so that the corner 321c is positioned to the right of the corner 322c as viewed in FIG. 2, the groove 322C is cut off from the flow passage 201. The intermediate portion of the flow passage 324 is arranged so to pass through necessary lubricating portions.

A compression coil spring 323 is interposed between the enlarged-diameter portion 321B and the other end face of the cylinder chamber 322 to bias the spool 321 in a direction in which the chamber 322a is contracted.

A chamber 322b which accommodates the spring 323 and faces the other end face 321b of the enlarged-diameter portion 321B is communicated with the control means 160 through a signal pressure circuit 250.

The first adjusting means 110 will be explained below.

The means 110 is arranged so as to generate in a first pilot circuit 118 a hydraulic pressure which is proportional to the current supplied to a solenoid 116 from the controller 72. For this purpose, a spool 111 is accommodated in a cylinder chamber 113 and biased in one direction by means of a compression coil spring 112. The spool 111 has two enlarged-diameter portions 111c and 111d which defines a chamber 111e therebetween. The chamber 111e is selectively communicated with and cut off from the main circuit 200 in response to the movement of the spool 111 and also communicated with the first control circuit 220.

A chamber 111f which is defined by an end face 111a of the enlarged-diameter portion 111d on the side thereof which is remote from the chamber 111e is communicated with the first pilot circuit 118. The circuit 118 is arranged so that a portion of the oil therein is allowed to return to the tank 301 through a branch passage 119. The branch passage 119 is selectively opened and closed by a poppet valve 115 to return the hydraulic oil in the first pilot circuit 118 to the tank 301 through the branch passage 119 and to feed the oil to the chamber 111f, thus enabling adjustment of the area of communication between the chamber 111e and the main circuit 200. The poppet valve 115 is rigidly secured to a movable core 114 which is movable in a direction in which the branch passage 119 is closed by means of the exciting force from the solenoid 116 controlled by the controller 72.

Accordingly, the spool 111 is moved to a position determined in proportion to the level of pressure in the first pilot circuit 118, thus enabling adjustment of the width of the V-shaped groove defined on the pulley shaft 30.

It should be noted that the cylinder chamber 113 is allowed to communicate with a lubricating circuit 240 through a flow passage 205a in response to the movement of the enlarged-diameter portion 111d.

The arrangement of the second adjusting means 120 is similar to that of the first adjusting means 110. More specifically, a movable core 124 and a poppet valve 125 are moved by means of the current supplied to a solenoid 126 from the controller 72 to generate a hydraulic pressure proportional to the size of the supplied current in a pilot circuit 128. A spool 121 is accommodated in a cylinder chamber 123 and biased in one direction by means of a compression coil spring 122. The spool 121 has two enlarged-diameter portions 121c and 121d which define a chamber 121e therebetween. The chamber 121e is selectively communicated with and cut off from the main circuit 200 in response to the movement of the spool 121 and also communicated with the second control circuit 230. The cylinder chamber 123 is communicated with the lubricating circuit 240 through a flow passage 205b.

In addition, a chamber 121f which is defined by an end face 121a of the enlarged-diameter portion 121d is communicated with the cylinder chamber 45 through a branch passage 129 and the second control circuit 230 to transmit the pressure in the cylinder chamber 45 to the spool 121, thus electrically effecting pressure control in a self-feedback manner.

A cylinder chamber 121g which accommodates the compression coil spring 122 is communicated with the pilot circuit 128 which is communicated with the main circuit 200 through an orifice 127.

First and second branch circuits 221 and 231 are branched off from the first and second control circuits 220 and 230, respectively, to lead to a selecting means which defines the control means 160.

The control means 160 will be explained below.

A spool 161 is accommodated in a cylinder chamber 159. Enlarged-diameter portions 161c and 161d are respectively formed at both ends of the spool 161, and a chamber 165c is defined between the portions 161c and 161d. A chamber 165a is defined between an end face 161a of the enlarged-diameter portion 161d and one end face of the cylinder chamber 159, and communicated with the first branch circuit 221 through a flow passage 221a.

On the other hand, a chamber 165b is defined between an end face 161b of the enlarged-diameter portion 161c and the other end face of the cylinder chamber 159, and a compression coil spring 164 is interposed within the chamber 165b to bias the spool 161 in a direction in which the chamber 165a is contracted.

Accordingly, the spool 161 is able to assume two positions which are respectively illustrated on both sides of the center line in FIG. 2. In the position shown on the lower side of the center line, the enlarged-diameter portion 161d has been moved rightward as viewed in FIG. 2 to such an extent that the chamber 165a has no volume, and in this state the enlarged-diameter portion 161c faces and shields an annular groove 162 which is formed by partially enlarging the inner diameter of the cylinder chamber 159, the groove 162 being communicated with a flow passage 221b.

In this state, the chamber 165c is communicated with the chamber 165b through an annular groove 163 and a flow passage 231b. The compression coil spring 164 is accommodated in this chamber 165b.

When the spool 161 is in the position shown on the upper side of the center line in FIG. 2, the enlarged-diameter portion 161d shields an annular groove 163 which is formed by partially enlarging the inner diameter of the cylinder chamber 159 in a manner similar to that of the annular groove 162. The flow passage 231b is communicated with a portion of the annular groove 163, and the groove 163 is, in turn, communicated with the second branch circuit 231. Accordingly, when the spool 161 is in a state wherein it has moved rightward to its maximum as shown on the lower side of the center line, the annular groove 163 provides communication between the chamber 165c and the second branch circuit 231. The chamber 165c is always communicated with the signal pressure circuit 250 regardless of the position of the spool 161.

Accordingly, in the selecting means 160 constituting the control means, when the pressure in the first control circuit 220 is higher than the pressure in the second branch circuit 231, the spool 161 is moved so that the volume of the chamber 165a reaches its maximum as shown on the upper side of the center line in FIG. 2. In consequence, the first branch circuit 221 is allowed to lead the pressure in the first control circuit 220 to the chamber 165a through the flow passage 221a and transmit the pressure in the first control circuit 220 to the pressure regulating valve 320 through the flow passage 221b, the chamber 165c and the signal pressure circuit 250. On the other hand, when the pressure in the second branch circuit 231 is higher than the pressure in the first control circuit 220, the pressure in the second branch circuit 231 acts on the spool end face 161b through the flow passage 231b and the chamber 165b so as to move the spool 161 in the opposite direction to its maximum as shown on the lower side of the center line. In consequence, the pressure in the second branch circuit 231 is transmitted to the pressure regulating valve 320 through the chamber 165c and the signal pressure circuit 250.

It should be noted that the first and second branch circuits 221 and 231 for leading hydraulic pressure to the selecting means 160 may be communicated directly with the respective chambers 111e and 121e in the first and second adjusting means 110 and 120 the pressures in which chambers 111e and 121e are the same as those in the first and second control circuits 220 and 230. The advantage offered by this arrangement is that the response in control of the main circuit pressure is improved since it is possible to detect the control hydraulic pressure supplied to each pulley at an earlier time and introduce the pressure through the shortest distance.

The following is a description of the operation of this embodiment.

When the first gear 312 of hydraulic pressure supply means 310 is driven by the motor through the pump shaft 311, the gear 312 rotates in mesh with the second gear 313. In consequence, the oil in the tank 301 is sucked into each of the oil chambers 316 defined by the casing 314 and the teeth of the gears 312 and 313 through the suction filter 302, and delivered to the main circuit 200 after each oil chamber 316 has rotated nearly one turn. The amount of oil delivered per one revolution of each pump shaft 311 is determined by the volume of each oil chamber 316 and the number of teeth of the gears 312 and 313.

Figure 3:
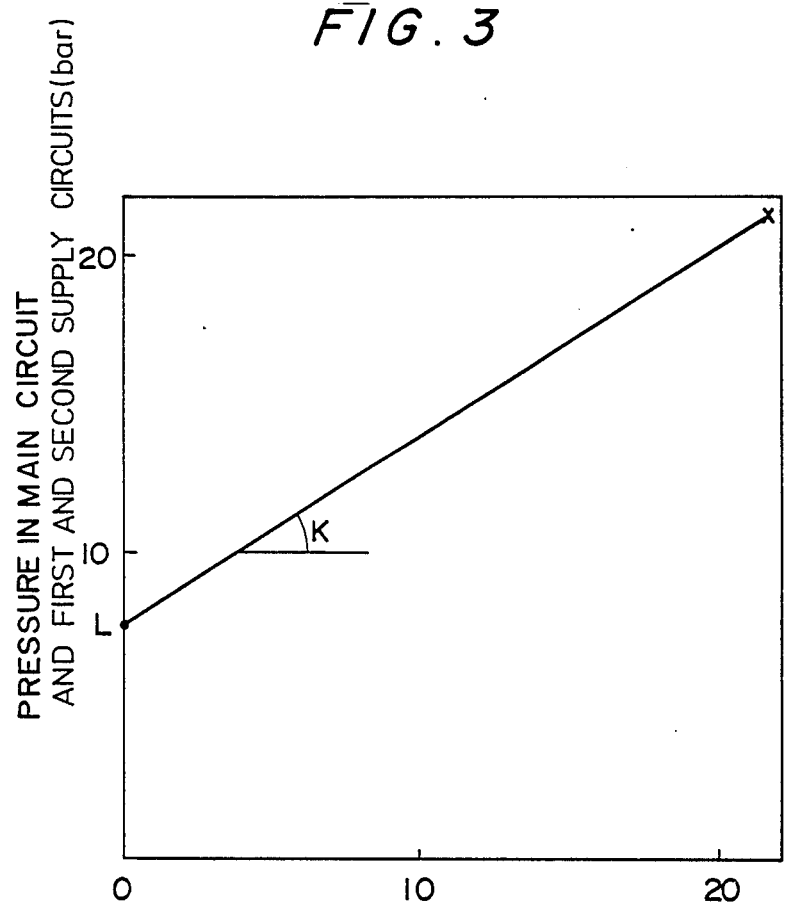
FIG. 3 is a graph showing the control of pressure in the main circuit in the first embodiment.

The oil delivered to the main circuit 200 is controlled to a predetermined set pressure level by the pressure regulating valve 320, and any surplus oil in the main circuit 200 is returned to the tank 301 after oiling portions which need lubrication. The set pressure is determined by the load applied to the end face 321b of the spool 321 from the spring 323 and a signal pressure also applied to the end face 321b from the control means 160 as shown in FIG. 3.

For example, when the pressure in the main circuit 200 becomes higher than the set level due to a decrease in the flow rate of oil consumed (i.e., an excess in the flow rate of oil delivered), the hydraulic power corresponding to the pressure in the main circuit 200 which acts on the end face 321a of the spool 321 overcomes the composite force consisting of the spring load applied to the end face 321b from the spring 323 and the hydraulic power corresponding to the signal pressure, and the spool 321, which is slidably received in the cylinder chamber 322 of the pressure regulating valve 320, is thereby moved from the illustrated position in a direction in which the spool 321 compresses the spring 323, so that an amount of oil which is proportional to the amount of movement of the spool 321 flows into the chamber 322a from the main circuit 200 through the flow passages 201, 202 and the throttle passage 202a. In consequence, the degree of opening defined between the spool corner 321c and the valve body corner 322c is increased to discharge the surplus oil in the main circuit 200 through the flow passage 201 to the flow passage 324 communicated with the lubricating portions.

Thus, the control of pressure in the main circuit 200 by the pressure regulating valve 320 is conducted in such a manner that the opening area of an annular throttle defined by the corners 321c and 322c is changed so as to maintain the pressure in the main circuit 200 at the set pressure, thereby appropriately discharging any surplus oil, and thus correcting any imbalance between the flow rate of oil delivered and the flow rate of oil consumed.

When the flow rate of consumed oil increases, the pressure regulating valve 320 operates in reverse to the above to maintain the pressure in the main circuit 200 at the set level.

The following is a description of the control of pressure in the main circuit 200 on the basis of a change in the signal pressure The pressure control effected in the case where the signal pressure supplied from the control means 160 is raised due to a change in the velocity ratio or the load will be explained below.

In response to a decrease in the hydraulic pressure generated by the signal pressure and acting on the end face 321b, the spool 321 of the pressure regulating valve 320 is moved in a direction in which the spring 323 is allowed to expand to decrease the opening area of the annular throttle defined by the spool corner 321c and the valve body corner 322c, thus reducing the amount of oil returned to the tank 301 through the annular groove 322C. In consequence, the pressure in the main circuit 200 increases until an increment in hydraulic force which is equal to a hydraulic force increment resulting from a change in the signal pressure acting on the end face 321b is obtained at the end face 321a which is subjected to the pressure in the main circuit 200. More specifically, among the characteristics shown in FIG. 3, the angle of inclination K represents the ratio of the pressure-receiving area of the end face 321b to the pressure-receiving area of the end face 321a, and the offset pressure L is proportional to the magnitude of the load of the spring 323.

On the other hand, when the signal pressure is lowered due to a change in the velocity ratio or the load, the spool 321 of the pressure regulating valve 320 is moved in a direction in which it compresses the spring 323 in response to lowering of the signal pressure acting on the end face 321b, thus causing an increase in the opening area of the annular throttle to increase the amount of surplus oil discharged therethrough. In consequence, the pressure in the main circuit 200 which acts on the end face 321a lowers until a decrement in hydraulic force which is equal to a hydraulic force decrement resulting from a change in the signal pressure acting on the end face 321b is obtained at the end face 321a. It should be noted that the throttle 202a disposed in the intermediate portion of the flow passage 202 for leading the pressure in the main circuit 200 to the chamber 322a serves to damp the movement of the spool 321.

The following is a description of the control of the velocity ratio between the input and output shafts 10 and 50 effected by the first adjusting means 110.

The poppet valve 115 generates in the first pilot circuit 118 a pressure which is proportional to the average magnitude of the current supplied to the solenoid 116 from the controller 72, and the spool 111 is controlled so as to move to a position determined in proportion to the pressure in the first pilot circuit 118, thus adjusting the width of the V-groove defined on the pulley shaft 30.

For example, to effect a speed change from a certain velocity ratio toward the output-speed-increasing side where the radius of wrap of the belt 60 around the pulley shaft 30 increases, the current supplied to the solenoid 116 is increased through the control effected by the controller 72, thus causing a rise in the pressure in the first pilot circuit 118. In consequence, the spool 111 in the first adjusting means 110 is moved in a direction in which it compresses the spring 112 by means of the hydraulic force acting on the end face 111a, thereby supplying the oil from the main circuit 200 to the cylinder chamber 35 in the pulley shaft 30 through the first control circuit 220. As a result, the pressure in the cylinder chamber 35 rises to push the movable pulley 32 toward the fixed pulley 31, thereby reducing the width of the V-groove, and thus increasing the radius of wrap of the belt 60 (the radius of wrap of the belt 60 around the pulley shaft 40 decreases relative to that of the belt 60 around the pulley shaft 30). When a target velocity ratio is reached, the spool 111 is returned to a predetermined position near the neutral position shown in FIG. 2.

Conversely, to effect a speed change from a certain velocity ratio toward the output-speed-reducing side where the radius of wrap of the belt 60 around the pulley shaft 30 decreases, the current supplied to the solenoid 116 is decreased through the control effected by the controller 72. In consequence, the pressure in the first pilot circuit 118 lowers, and the hydraulic force acting on the end face 111a of the spool 111 is overcome by the spring load applied from the spring 112, and the spool 111 is therefore moved in a direction in which the spring 112 is allowed to expand. Accordingly, the oil in the cylinder chamber 35 in the pulley shaft 30 is discharged to the lubricating circuit 240 through the first control circuit 220, thereby lowering the pressure in the cylinder chamber 35. As a result, the movable pulley 32 is moved by the action of the belt 60 which cuts into the V-groove in a direction in which the width of the V-groove is enlarged by means of the tension acting on the belt 60, thus decreasing the radius of wrap of the belt 60 around the pulley shaft 30.

On the other hand, when the velocity ratio is controlled so as to be constant, the position of the spool 111 is maintained in the vicinity of the neutral position shown in FIG. 2, thereby controlling the pressure in the cylinder chamber 35 at a predetermined level. More specifically, the pressure in the cylinder chamber 35 increases as the transmitted torque becomes greater. However, as the rotational speed of the pulley increases, the pressure in the cylinder chamber 35 becomes higher by virtue of the effect of the centrifugal force. For this reason, the pressure in the first control circuit 220 is controlled so that the pressure level becomes increasingly lower than the level of pressure in the cylinder chamber 35 as the rotational speed of the pulley shaft 30 increases. The orifice 117 influences the flow rate of oil flowing through the branch passage 119 and consumed by the solenoid valve and also the response of the first adjusting means 110.

The arrangement of the second adjusting means 120 is similar to that of the first adjusting means 110. More specifically, the second adjusting means 120 also consists of a solenoid valve and a spool 121 and is capable of controlling the pressure in the cylinder chamber 45 in the pulley shaft 40 in proportion to the average magnitude of the current supplied to a solenoid 126. However, the second adjusting means 120 is different from the first adjusting means 110 in terms of the function.

Figure 4:
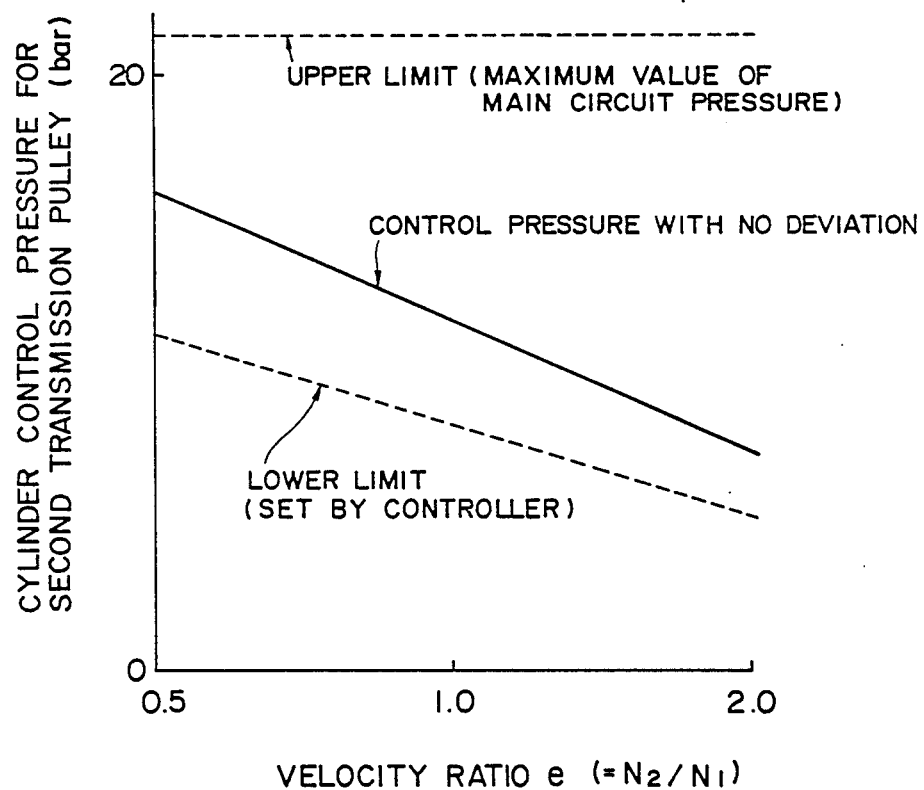
FIG. 4 is a graph showing the relationship between the velocity ratio and the cylinder control pressure for controlling the second transmission pulley in the first embodiment.
Figure 5:
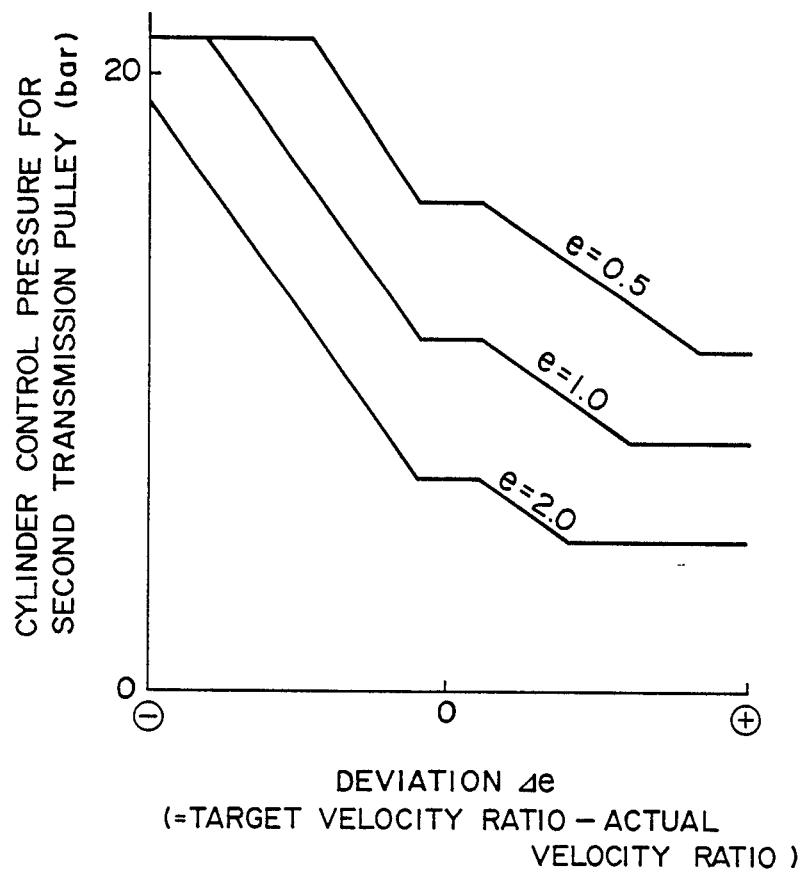
FIG. 5 is a graph showing the relationship between the cylinder control pressure and the control deviation.

The second adjusting means 120 controls the pressure supplied to the cylinder chamber 45 as a function of the velocity ratio as shown in FIG. 4 and also as a function of the control deviation (the difference between a target velocity ratio and an actual velocity ratio) as shown in FIG. 5. More specifically, the second adjusting means 120 has two functions: first, the means 120 appropriately controls the pressure of contact between the belt 60 and the pair of pulleys 41, 42 and tension acting on the belt 60; and secondly, when there is a delay in attaining a target velocity ratio and the actual velocity ratio has a predetermined deviation from the target velocity ratio (although the velocity ratio control is normally effected through the pulley shaft 30), the second adjusting means 120 assists the first adjusting means 110 with positively applying a thrust to the pulley shaft 40 in a direction in which the deviation is decreased.

Explaining this operation in more detail, the second adjusting means 120 leads a control pressure of the second control circuit 230, which is a pressure to be controlled thereby, to the end face 121a of the spool 121 to effect self-feedback. More specifically, the position of the spool 121 is determined by the balance between the hydraulic force corresponding to the pressure in the cylinder chamber 45 and acting on the end face 121a and the hydraulic force corresponding to the pressure in the pilot circuit 128, which corresponds to the average magnitude of the current supplied to the solenoid 126, and acting on the end face 121b, together with the spring force applied to the end face 121b from the spring 122. Therefore, the pressure in the second control circuit 230 is controlled so as to be proportional to the pressure in the pilot circuit 128 by the movement of the spool 121 which adjusts the state of communication between the second control circuit 230 and the main circuit 200 or the branch circuit 205b branched off from the lubricating circuit 240.

For example, when the movable pulley 42 is moved in a direction in which the volume of the cylinder chamber 45 decreases in the case where the pressure in the pilot circuit 128 is constant, the second adjusting means 120 sensitively detects a rise in pressure in the second control circuit 230, and the spool 121 moves in a direction in which the hydraulic oil in the second control circuit 230 is discharged to the lubricating circuit 240, thereby discharging the oil at a flow rate corresponding to the movement of the movable pulley 42, and thus maintaining the pressure in the cylinder 45 at a constant level.

Conversely, when the movable pulley 42 moves in a direction in which the volume of the cylinder chamber 45 increases, the second adjusting means 120 sensitively detects a lowering in pressure in the second control circuit 230 through the movement of the spool 121 in a similar manner, and supplies the hydraulic oil in the main circuit 200 to the cylinder chamber 45 through the second control circuit 230, thereby maintaining the pressure in the cylinder chamber 45 at a constant level.

On the other hand, when the current supplied to the solenoid 126 is lowered in response to a command from the controller 72, the second adjusting means 120 operates as follows.

When the current supplied to the solenoid 126 is lowered, the attracting force which acts on the movable core 124 against the pressure in the pilot circuit 128 lowers, and the force for retaining the poppet valve 125 decreases correspondingly to let the hydraulic oil in the pilot circuit 128 escape to the tank 301. In consequence, the flow rate of oil passing through the orifice 127 increases, and the pressure in the pilot circuit 128 lowers to a level which balances with the attracting force acting on the movable core 124. It should be noted that the pressure in the pilot circuit 128 is different in level from the pressure in the main circuit 200 due to the existence of the orifice 127, this pressure difference increasing as the flow rate of oil passing through the orifice 127 (i.e., the flow rate determined by the flow rate of oil returned to the tank 301 through the poppet valve 125 and that of oil led to the pilot circuit 128 in response to the movement of the spool 121) becomes higher.

When the pressure in the pilot circuit 128 lowers due to a reduction in current supplied to the solenoid 126, the hydraulic force acting on the end face 121b decreases, so that the spool 121 is moved in a direction in which the spring 122 is compressed by the hydraulic force corresponding to the pressure in the second control circuit 230 and acting on the end face 121a, thus letting the oil in the cylinder chamber 45 escape to the lubricating circuit 240 through the second control circuit 230. When the pressure in the second control circuit 230 has lowered by an amount proportional to a change in pressure in the pilot circuit 128, the spool 121 returns to a position near the neutral position shown in FIG. 2 to maintain the pressure in the second control circuit 230 and in the cylinder chamber 45.

The selecting means 160 is selectively switched over between two positions in response to the pressures of the first and second control circuits 220 and 230 which are respectively led to both end faces 161a and 161b of the spool 161 so that either one of the first and second control circuits 220 and 230 which has a higher pressure than the other is communicated with the signal pressure circuit 250. In FIG. 2, the two positions are shown on both sides of the center line of the spool 161. It should be noted that the end face 161b is subjected to a relatively weak biasing force from a spring 164 for the purpose of determining the initial position of the spool 161 so as to preferentially output the pressure in the second control circuit 230, which is of the first importance.

For example, when the pressure in the second control circuit 230 is higher than that in the first control circuit 220, the spool 161 is pushed by the pressure in the chamber 165b in a direction in which the volume of the chamber 165a decreases, so that the annular groove 163 communicated with the second control circuit 230 is communicated with the signal pressure circuit 250 through the chamber 165c. In consequence, the pressure in the second control circuit 230 is led to the pressure regulating valve 320, and the pressure in the main circuit 200 is allowed to change in accordance with the change in pressure in the second control circuit 230.

When the pressure in the first control circuit 220 is raised higher than the pressure in the second control circuit 230 by a speed change operation or the like, the spool 161 moves in a direction in which the volume of the chamber 165a increases while compressing the spring 164. In consequence, the annular groove 162 communicated with the first control circuit 220 is allowed to communicate with the signal pressure circuit 250 through the chamber 165c, whereby the pressure in the fist control circuit 220 is led to the pressure regulating valve 220, thus allowing the pressure in the main circuit 200 to change in accordance with variations in pressure in the first control circuit 220.

However, in either case, the pressure in the main circuit 200 is equal to or higher than the pressure in either the first or second control circuit 220 or 230, and the highest pressure in the main circuit 200 is equal to a value obtained by dividing the spring load of the spring 323 by a difference obtained by subtracting the working area of the end face 321b of the spool 321 which is subjected to the pressure in the signal pressure circuit 250 from the working area of the end face 321a which is subjected to the pressure in the main circuit 200. Therefore, the highest pressure in the main circuit 200 can be adjusted by varying the spring load of the spring 323, and no special safety valve is needed.

Thus, in the first embodiment, the pressure in the main circuit 200 is controlled by discharging any surplus oil using an inexpensive and reliable hydraulic control means without employing any special electronic control means, and it is possible, according to this embodiment, to make the pressure in the main circuit 200 lower than that in the prior art on the average. In particular, it is possible to obtain great advantages in such running conditions that the velocity ratio is relatively high (i.e., the transmission ratio is relatively low); the input torque is relatively low; and the speed change frequency is relatively low.

A second embodiment of the present invention will be explained below with reference to FIG. 6.

This embodiment differs from the first embodiment in that the second embodiment is provided with a variable displacement type vane pump 80 which is directly driven by an engine and which is designed to enable the amount of oil delivered per revolution of the pump shaft to be adjusted in a stepless manner, a displacement control valve 90 which adjusts the pressure in the main circuit 200 by controlling the amount of oil delivered by the pump 80 per revolution of the pump shaft, and a clutch pressure control valve 100 for supplying a control pressure to a wet-type multiple disc clutch 20 which defines a starting clutch.

The displacement control valve 90 consists of a cylinder 93, a spool 91 slidably received in the cylinder 93, and a spring 92 acting on an end face 91b of the spool 91. The cylinder 93 has an annular groove 93a communicated with the main circuit 200 through a flow passage 201, a port 93c communicated with a control chamber 87 in the variable displacement type vane pump 80 through a flow passage 88, and an annular groove 93b led to a tank 94.

An end face 91a of the spool 91 is subjected to the pressure in the main circuit 200 which is led thereto through a branch flow passage 202, while an end face 91c of the spool 91 is subjected to a signal pressure from the selecting means 160 which is led thereto through the signal pressure circuit 250. Further, the end face 91b of the spool 91 is subjected to the biasing force from the spring 92 which acts in the same direction as the direction in which the hydraulic force acts on the end face 91c.

The variable displacement type vane pump 80 consists of a slide cam 81 which is slidable along guide surfaces 89a and 89b of a housing 89, a rotor 82 having vanes 83 radially and slidably attached thereto, a spring 85 pushing the slide cam 81 in which a maximum eccentricity is reached, and a bias chamber 86 and a control chamber 87 which are separately defined by the housing 89 and the slide cam 81.

It should be noted that the bias chamber 86, the control chamber 87 and the spring 85 define in combination a control actuator, while the slide cam 81 defines a displacement adjusting member. The bias chamber 86 is supplied with the pressure in the main circuit 200 through a flow passage 203, while the control chamber 87 is supplied with a control pressure from the displacement control valve 90 through a flow passage 88. The position (the amount of eccentricity) of the slide cam 81 is determined by the balance between the force applied thereto by the pressure in the bias chamber 86 on the one hand and the force applied thereto by the pressure in the control chamber 87 and the force applied thereto from the spring 85 on the other.

The following is a description of the mechanism that the pressure in the main circuit 200 can be controlled by the combination of the variable displacement type vane pump 80 and the displacement control valve 90.

In the vane pump 80, a vane chamber 84 which is defined between each pair of adjacent vanes 83 is changed in volume in response to the rotation of the rotor 82 which is directly coupled to an engine, the amount of change in volume being proportional to the amount of eccentricity between the center of a cylindrical cam surface 81e of the slide cam 81 and the center of the rotor 82. More specifically, in a region where the volume of each vane chamber 84 increases, the vane chamber 84 is communicated with a suction port 89c, so that oil in the tank 94 is sucked into the vane chamber 84 through a suction filter 95. In a region where the volume of each vane chamber 84 decreases, the vane chamber 84 is communicated with a delivery port 89d, so that the oil in the vane chamber 84 is delivered to the main circuit 200.

The pressure in the main circuit 200 is maintained at a constant level by balancing between the flow rate of oil delivered from the pump 80 and the flow rate of oil consumed by the control valves 100, 110, 120 and the like, and no unnecessary oil is delivered.

For example, in the case where a speed change is effected from a constant velocity ratio state during a steady running, when the pressure in the main circuit 200 begins to lower in response to an increase in the flow rate of oil consumed, the hydraulic force acting on the end face 91a of the displacement control valve 90 decreases, and the spool 91 moves in a direction in which the hydraulic oil in the main circuit 200 is led to the control chamber 87 through the flow passage 201, the annular groove 93a, the port 93c and the flow passage 88. As a result, the pressure in the control chamber 87 rises, and this increase in pressure causes the slide cam 81 to be pushed in a direction in which the amount of eccentricity increases, so that the flow rate of oil delivered from the pump 80 increases to maintain the pressure in the main circuit 200 at a constant level.

On the other hand, the pressure in the main circuit 200 can be controlled so as to shift in response to a signal pressure from the selecting means 160 in a manner similar to that in the first embodiment. This function is provided by the displacement control valve 90. More specifically, as the signal pressure increases, the hydraulic force acting on the end face 91c of the spool 91 increases, and the hydraulic power acting on the end face 91a increases by an amount equal to an increment in the hydraulic force acting on the end face 91c. In other words, among the characteristics shown in FIG. 4, the angle of inclination K represents the ratio of the pressure-receiving area of the end face 91c to that of the end face 91a, the ratio being 1 or less. The offset pressure L is proportional to the spring load of the spring 92 which acts on the end face 91b, and inversely proportional to the pressure-receiving area of the end face 91a. In addition, since the pressure in the main circuit 200 is equal to or higher than the signal pressure, the upper limit of the pressure is also determined by the above-described pressure-receiving area difference and the force applied by the spring 92.

The wet clutch 20 has a structure in which friction members are clamped by means of a piston 21. The torque transmitted by the clutch 20 is substantially proportional to the level of the hydraulic pressure acting on the piston 21. This hydraulic pressure is controlled by the clutch pressure control valve 100 which is activated by an electric signal from the controller 72 in a manner similar to that of the second adjusting means 120. More specifically, the power transmission condition at the time of starting can be electrically controlled by the wet clutch 20 and the clutch pressure control valve 100.

Although in the first embodiment the pressure in the main circuit 200 alone is controlled so as to be minimized by discharging any surplus oil, the second embodiment further enables minimization of the flow rate of oil delivered by the pump 80 to the main circuit 200. Therefore, it is advantageously possible to further reduce the torque required to drive the pump 80 and improve the stepless transmission efficiency. As a result, the fuel consumption during running of the vehicle is bettered, and the energy efficiency in the hydraulic system is improved, so that it is possible to suppress a rise in temperature of the oil within the tank 94 and prevent deterioration of the oil and seizing of the slide surfaces.

Figure 7B:
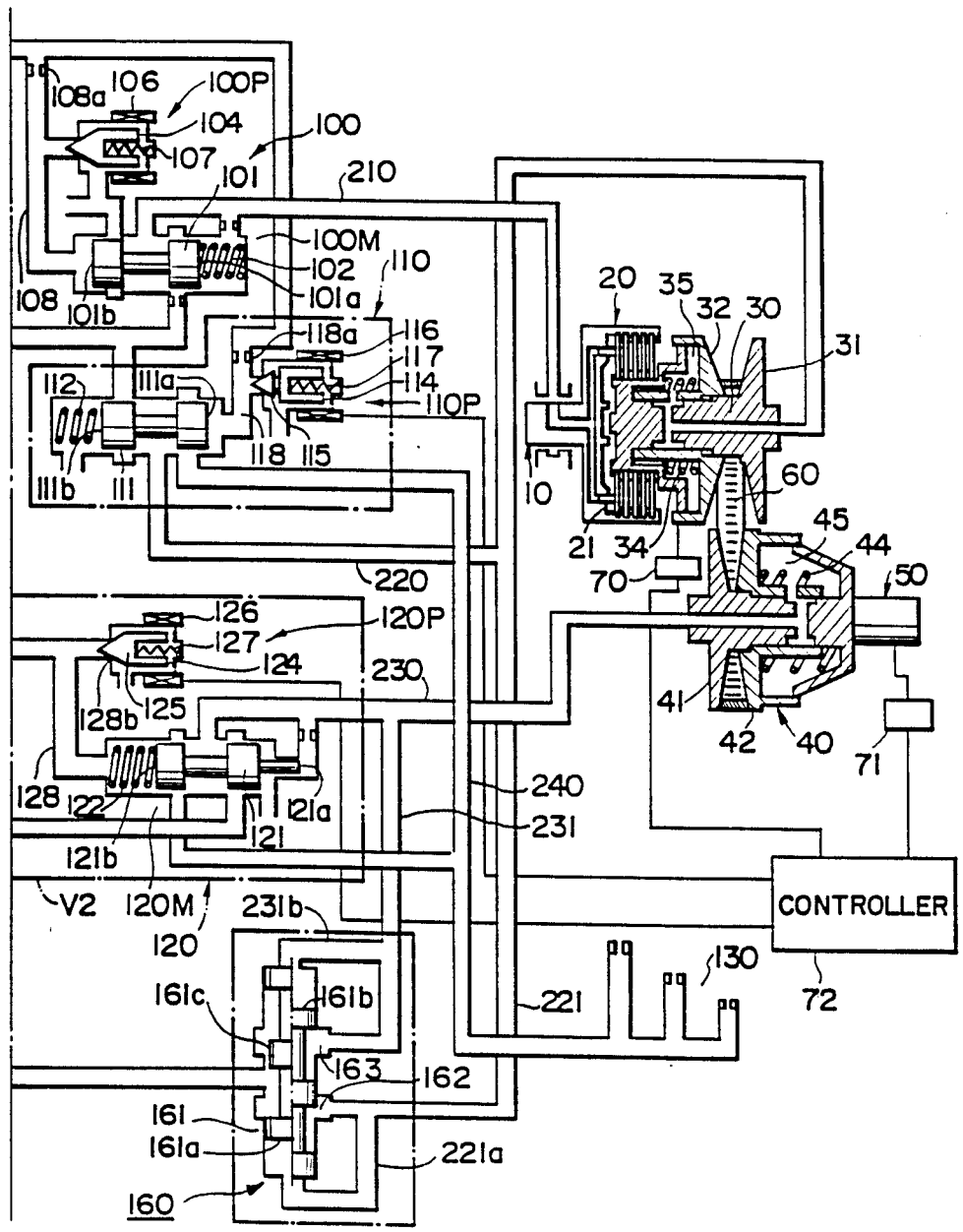

FIG. 7 shows a third embodiment of the present invention in which, when the pressure in the main circuit 200 changes, each spool valve is controlled by a controller adopting the pulse-width modulation method. This embodiment particularly aims at arranging a hydraulic control apparatus which enables simplification of the electronic control circuit, and a primary object of the this embodiment is to control the cylinder control pressure for the second transmission pulley 40 as shown in FIGS. 4 and 5 and the control pressure for the starting clutch 20 by an open loop control system and in accordance with the pulse-width modulation method.

It should be noted that the principal constituent elements of the first embodiment are also employed in this embodiment as they are in the same way as that in the second embodiment. The arrangement of portions of this embodiment which is different from that of the second embodiment will mainly be explained below, including the operation principle thereof.

Added to the arrangement of the second embodiment are a pressure reducing valve 140 and a pilot supply circuit 260. In addition, the spool 121 of the second adjusting means 120 and solenoid valves 100P, 110P and 120P respectively defining control valves are changed in terms of configuration.

The main pressure for each solenoid valve is controlled to a constant level which is below the pressure (variable in accordance with each controlled state) in the main circuit 200. The pressure reducing valve 140 for supplying oil to the pilot supply circuit 260 consists of a spool 141, a spring 142 and a cylinder 143. The spool 141 is composed of two cylindrical portions having different outer diameters (for the purpose of producing an area difference between two pressure-receiving surfaces) and a rod member having a smaller outer diameter than those of the cylindrical portions and connecting them together in one unit. The cylinder 143 has two cylinder portions 143a and 143b having different inner diameters and linearly as well as slidably guiding the spool 141, together with an annular groove 143c communicated with the main circuit 200. The operation principle of the pressure reducing valve 140 will be explained below.

The spool 141 received in the cylinder portions 143a and 143b of the cylinder 143 is subjected at one end face 141b thereof to the force applied by the spring 142, the magnitude of the force being proportional to the amount of movement of the spool 141. The spool 141 is also subjected to a hydraulic force which is equal to the product of the area difference between the pressure-receiving surfaces 141a and 141c and the pressure in the chamber 143d, said hydraulic force acting counter to the force applied by the spring 142.

For example, when the pressure in the chamber 143d is lower than a normal level, the spool 141 is overcome by the force from the spring 142 and moved in a direction in which the degree of opening of the throttle defined by the annular groove 143c and the spool end face 141c increases to allow the hydraulic oil in the main circuit 200 to flow into the chamber 143d, thereby increasing the pressure in the chamber 143d. When the pressure in the chamber 143d becomes excessively high, the hydraulic pressure acting on the spool 141 overcomes the force applied from the spring 142 to decrease the opening of the throttle defined by the annular groove 143c and the spool end face 141c, thereby reducing the flow rate of oil flowing into the chamber 143d, and thus lowering the pressure in the chamber 143d.

As a result, the pressure in the chamber 143d is controlled at a constant level, and the oil having this constant pressure is supplied to each of the solenoid valves 100P, 110P and 120P through the pilot supply circuit 250.

Pulse-width modulation type control valves in this embodiment include the clutch pressure control valve 100 for controlling the starting clutch so as to be smoothly engaged, the first adjusting means 110 in the throttle opening control system for controlling the velocity ratio of the stepless transmission in accordance with a command from the controller 72, and the second adjusting means 120 of the pressure control type for controlling the pressure of contact between the belt 60 and the pulley shaft 40 (also the pulley shaft 30 as a consequence) in correspondence with the velocity ratio, and these control valves respectively have the solenoid valves 100P, 110P and 120P which operate on the basis of the same principle.

For example, the solenoid valve 120P consists of a solenoid 126, a spring 127, a movable core 124, and a poppet valve 125 which is integral with the movable core 124. The solenoid valve 120P is supplied with the hydraulic oil from the pilot supply circuit 250 through an orifice 128a.

When the solenoid 126 is not energized, the movable core 124 is pushed by the spring 127 to cause the poppet valve 125 to be brought into close contact with a valve seat 128b, so that the pressure in the pilot flow passage 128 becomes the same level as that of the pressure in the pilot supply circuit 250. When the solenoid 126 is energized, the movable core 124 is attracted in a direction in which it compresses the spring 127, causing the poppet valve 125 to separate from the valve seat 128b. In consequence, the pressure in the pilot flow passage 128 lowers near the atmospheric pressure, and the oil flowing into the pilot flow passage 128 through the orifice 128a passes through the solenoid valve 120P and is discharged into the tank 94.

In this pulse-width modulation system, the ratio between the non-energization duration and the energization duration is varied within a constant total time duration to control electrically an average pressure in the pilot flow passage 128.

On the other hand, the second adjusting means 120 consists of a spool 121 having end faces 121a, 121b with different pressure-receiving areas, a spring 122 which acts on the end face 121b having a larger pressure-receiving area, etc. The end face 121b of the spool 121 is subjected to the pressure in the pilot flow passage 128, while the end face 121a is subjected to the pressure in the second control circuit 230 which is to be finally controlled. The operation principle of this main valve 120M (the same is the case with the other main valves) is the same as that in the foregoing embodiments.

The third embodiment offers the following advantages.

When a microcomputer is provided in the arithmetic processing section to constitute an electronic control circuit, it becomes unnecessary to provide a D/A converter and a constant-current circuit, and the simplification of the electronic control circuit allows reductions in the size and costs of the apparatus as a whole. Further, the solenoid valves which are employed as electrohydraulic converter valves for the control valves 100, 110 and 120 are two-position selector valves in which the respective solenoids 106, 116 and 126 are ON/OFF controlled, which means that it is possible to decrease the air gap between the movable core and the associated attracting surface and obtain an increased attracting force (inversely proportional to the amount of air gap). Accordingly, it is possible to reduce the number of turns of coils for the solenoids 106, 116 and 126, which means that the size and weight of the apparatus as a whole can be reduced, and it is also possible to reduce the electric power consumed by the solenoids 106, 116 and 126. Further, since it is possible to reduce the battery capacity and generator capacity of the vehicle, the arrangement of the third embodiment contributes to the reduction in weight of the vehicle and the improvement in fuel consumption.

Figure 6:
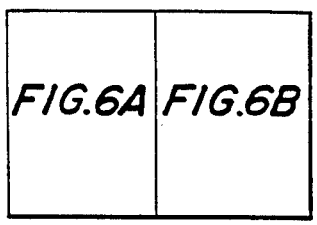
FIGS. 6 and 7 (FIGS. 6A & 6B and FIGS. 7A & 7B) respectively show the arrangements of second and third embodiments of the present invention.
Figure 6A:
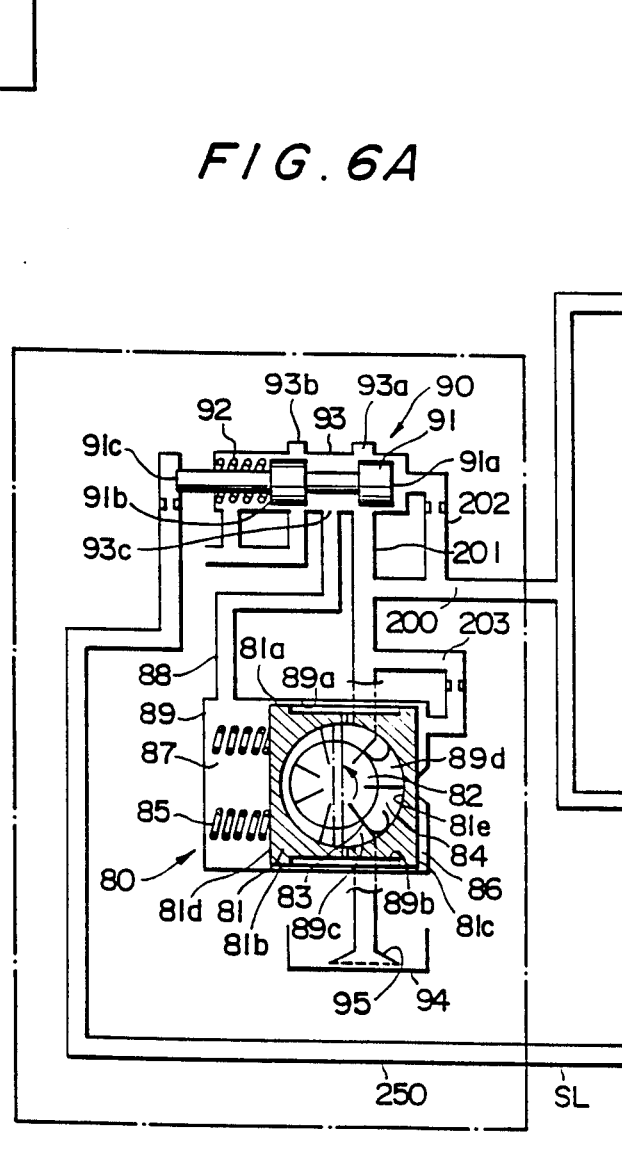
Figure 6B:
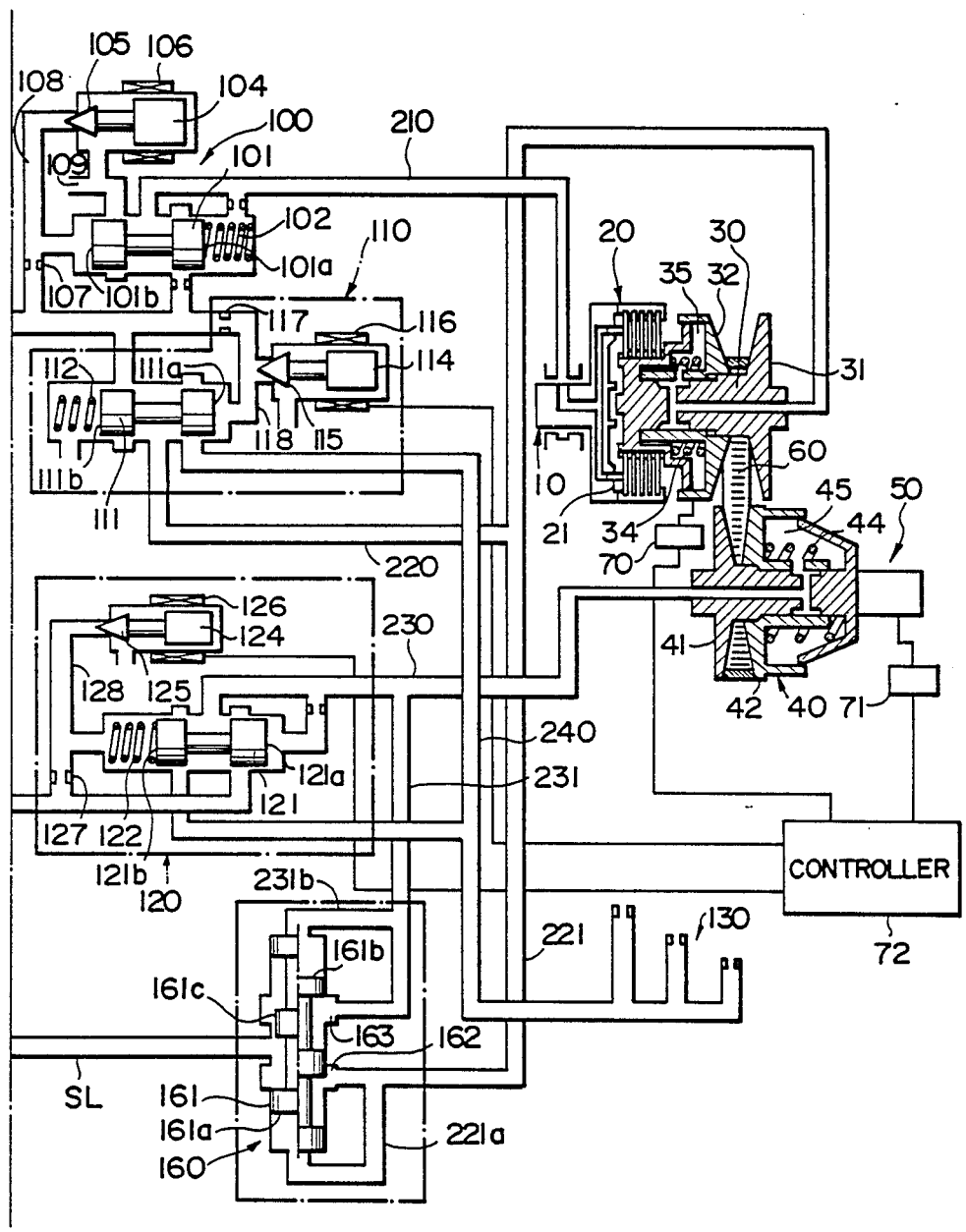
Figure 8:
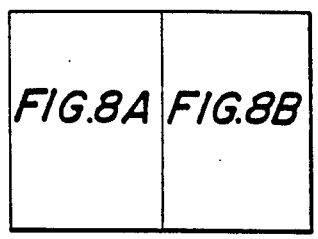
FIG. 8 (FIGS. 8A & 8B) shows the arrangement of a modification of the embodiment shown in FIG. 6.
Figure 8A:
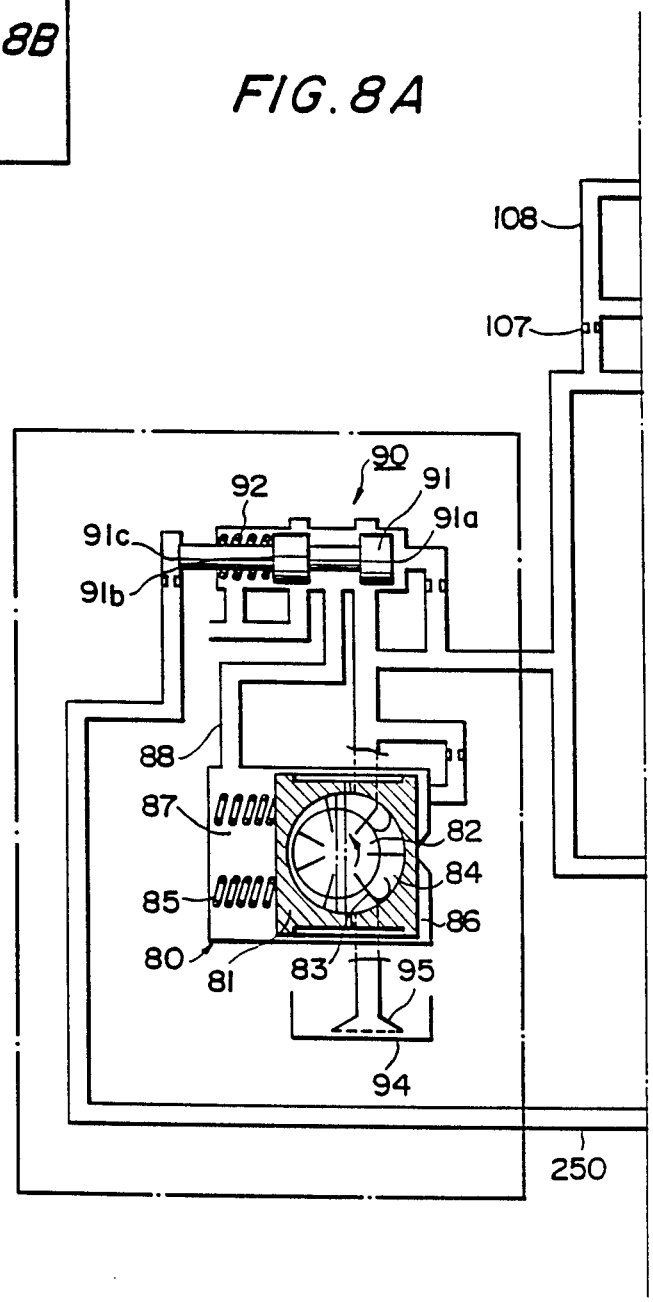
Figure 8B:
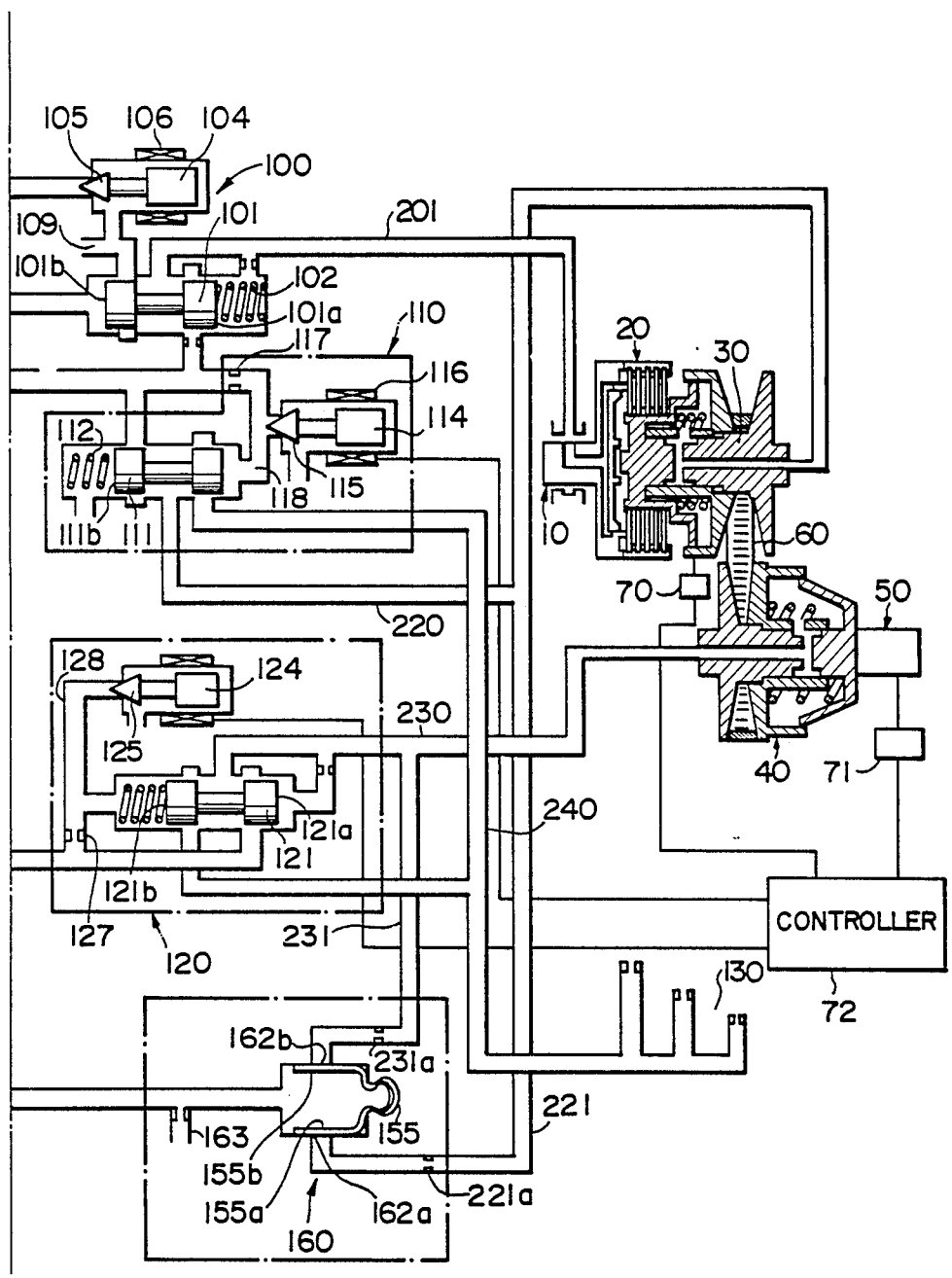

Referring next to FIG. 8, which shows a modification of the embodiment shown in FIG. 6, the selecting means 160 in this arrangement is constituted by a leaf spring 155. Two end portions 155a and 155b of this leaf spring 155 respectively have biasing forces which are so set that a rise in pressure in each of the first and second branch circuits 221 and 231 causes it to communicate with the signal pressure circuit 250. Accordingly, the arrangement is simplified, and yet it is possible to obtain advantages similar to those offered by the arrangement shown in FIG. 6.

As has been described above, the present invention provides a hydraulic control apparatus for a stepless transmission wherein an endless belt is stretched between and wrapped around a pair of pulleys, and the width of a groove defined in each pulley for wrapping the belt is varied to effect a change of speed between the pulleys, comprising: hydraulic pressure supply means capable of varying the level of hydraulic pressure supplied therefrom; first adjusting means for adjusting the hydraulic pressure supplied from the hydraulic pressure supply means to a level required for a cylinder chamber of either one of the pair of pulleys; second adjusting means for adjusting the hydraulic pressure supplied from the hydraulic pressure supply means to a level required for a cylinder chamber of the other of the pair of pulleys; and control means for controlling the hydraulic pressure generated by the hydraulic pressure supply means on the basis of either one of the hydraulic pressures respectively adjusted by the first and second adjusting means which is higher than the other. Accordingly, it is advantageously possible to improve the transmission efficiency.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A hydraulic control apparatus for a stepless transmission wherein endless belt means is stretched or pushed between and wrapped around a pair of pulleys, and the wrapping radius defined in each pulley for wrapping said endless belt means is carried to effect a change of rotational speed between said pulleys by the hydraulic pressure, comprising:
   (a) hydraulic pressure supply means comprising pressure control means for automatically controlling the level of hydraulic pressure supplied therefrom;
   (b) first adjusting means for adjusting the hydraulic pressure supplied form said hydraulic pressure supply means to a required level and supplying adjusted hydraulic pressure to a cylinder chamber of either one of said pair of pulleys through a first control circuit;

(c) second adjusting means for adjusting the hydraulic pressure supplied from said hydraulic pressure supply means to a required level and supplying adjusted hydraulic pressure to a cylinder chamber of either one of said pair of pulleys through a second control circuit; and (d) control means for detecting the hydraulic pressure through said first and second control circuits and for controlling said pressure control means of said hydraulic pressure supply means on the basis of the higher of the output pressures of either said adjusting means in order to supply a hydraulic pressure which is equal to or higher than said higher adjusted hydraulic pressure, whereby the hydraulic pressure generated by said hydraulic pressure supply means is minimized to reduce the power consumption.

2. A hydraulic control apparatus according to claim 1, wherein said control means includes means for detecting pressures in oil-hydraulic circuits extending from said first and second adjusting means to said cylinder chambers, respectively.

3. A hydraulic control apparatus according to claim 1, wherein said control means includes selecting means for selecting either one of the hydraulic pressures respectively adjusted by said first and second adjusting means which is higher than the other.

4. A hydraulic control apparatus according to claim 3, wherein said selecting means is communicated with a branch passage which is branched off from an intermediate portion of the oil-hydraulic circuit extending from said first adjusting means to one of said cylinder chambers, and further communicated with a branch passage which is branched off from an intermediate portion of the oil-hydraulic circuit extending from said second adjusting means to the other cylinder chamber.

5. A hydraulic control apparatus according to claim 4, wherein said hydraulic pressure supply means includes:
a pressure regulating valve for controlling the hydraulic pressure supplied to said first and second adjusting means on the basis of a higher hydraulic pressure selected by said selecting means.

6. A hydraulic control apparatus according to claim 5, wherein said hydraulic pressure supply means is defined by a positive displacement type oil-hydraulic rotary pump which continuously supplies a hydraulic pressure, and said pressure regulating valve returning any surplus oil supplied from said pump to a tank on the basis of a higher hydraulic pressure selected thereby, thus controlling the hydraulic pressures respectively supplied to said first and second adjusting means.

7. A hydraulic control apparatus according to claim 1, wherein the hydraulic pressure supplied to each of said cylinder chambers is controlled in such a manner that, as the rotational speed of the corresponding pulley increases, the level of said hydraulic pressure is lowered, thereby compensating the hydraulic pressure which is increased by the effect of centrifugal force.

8. A hydraulic control apparatus according to claim 1, wherein said hydraulic pressure supply means includes a variable displacement pump in which the amount of oil delivered per revolution of the pump shaft can be adjusted steplessly, and displacement control means capable of controlling the discharge rate of said pump so that the delivery pressure of said pump corresponds to a control signal pressure supplied from said control means, thereby eliminating any surplus in the oil delivered from said pump.

9. A hydraulic control apparatus according to claim 8, wherein said pump rotates together with an input shaft of said stepless transmission in one unit, and the amount of oil delivered from said pump per revolution of the pump shaft is varied by leading a displacement control pressure from said displacement control means to a control actuator which is connected to a displacement adjusting member of said pump.

10. A hydraulic control apparatus according to claim 1, wherein each of said adjusting means controls a hydraulic pressure supplied to the corresponding cylinder chamber from said hydraulic pressure supply means in accordance with the degree of opening of a spool valve which is activated by means of a pilot control pressure obtained by adjusting the hydraulic pressure generated by said hydraulic pressure supply means to a predetermined level by means of a pilot valve.

11. A stepless transmission in which endless belt means is stretched or pushed between and wrapped around a pair of pulleys, comprising:
(a) first cylinder means provided on one of said pulleys for varying the width of a groove defined in said pulley;
(b) second cylinder means provided on the other pulley for varying the width of a groove defined in said pulley;
(c) hydraulic pressure supply means comprising pressure control means for automatically controlling the level of hydraulic pressure supplied therefrom;
(d) first adjusting means interposed between said hydraulic pressure supply means and said first cylinder means to obtain a pressure required for said first cylinder means;
(e) second adjusting means interposed between said hydraulic pressure supply means and said second cylinder means to obtain a pressure required for said second cylinder means; and
(f) selecting means for selecting either one of the pressures adjusted by said first and second adjusting means which is higher than the other, and for controlling the hydraulic pressure generated from said hydraulic pressure supply means on the basis of the selected pressure.

12. A stepless transmission according to claim 11, wherein said selecting means is connected with means for detecting pressures which have already been adjusted by said first and second adjusting means.

13. A stepless transmission according to claim 11, wherein said selecting means is communicated with branch passages which are respectively led from the passage between said first adjusting means and said first cylinder means and from the passage between said second adjusting means and said second cylinder means.

14. A stepless transmission according to claim 11, wherein said hydraulic pressure supply means is defined by a positive displacement type oil-hydraulic rotary pump which continuously supplies a hydraulic pressure, and said pressure regulating valve returning any surplus oil supplied from said pump to a tank on the basis of a higher hydraulic pressure selected thereby, thus controlling the hydraulic pressures respectively supplied to said first and second adjusting means.

15. A stepless transmission according to claim 11, wherein said hydraulic pressure supply means includes a variable displacement pump in which the amount of oil delivered per revolution of the pump shaft can be adjusted steplessly, and displacement control means capable of controlling the discharge rate of said pump so that the delivery pressure of said pump corresponds to a control signal pressure supplied from said selecting means, thereby eliminating any surplus in the oil delivered from said pump.

16. A stepless transmission according to claim 15, wherein said pump rotates together with an input shaft of said stepless transmission in one unit, and the amount of oil delivered from said pump per revolution of the pump shaft is varied by leading a control pressure from said displacement control means to a control actuator which is connected to a displacement adjusting member of said pump.

17. A stepless pulley having a fixed portion and a movable portion;
    (a) endless belt means having a portion thereof held between said fixed and movable portions of said first pulley;
    (b) a second pulley having a fixed portion and a movable portion which hold another portion of said endless belt means therebetween;
    (c) first cylinder means provided on said first pulley for activating said movable portion of said first pulley to move toward and away from said fixed portion of said first pulley;
    (d) second cylinder means provided on said second pulley for activating said movable portion of said second pulley to move toward and away from said fixed portion of said second pulley;
    (e) hydraulic pressure supply means comprising pressure control means for automatically controlling the level of hydraulic pressure supplied therefrom;
    (f) first adjusting means interposed between said hydraulic pressure supply means and said first cylinder means to obtain a pressure required for said first cylinder means;
    (g) second adjusting means interposed between said hydraulic pressure supply means and said second cylinder means to obtain a pressure required for said second cylinder means; and
    (h) selecting means for selecting either one of the pressures adjusted by said first and second adjusting means which is higher than the other, and controlling the hydraulic pressure generated from said hydraulic pressure supply means on the basis of the selected pressure.

18. A stepless transmission according to claim 17, wherein said selecting means is connected with means for detecting pressures which have already been adjusted by said first and second adjusting means.

19. A stepless transmission according to claim 17, wherein said selecting means is communicated with branch passages which are respectively led from the passage between said first adjusting means and said first cylinder means and from the passage between said second adjusting means and said second cylinder means.

20. A stepless transmission according to claim 19, wherein said hydraulic pressure supply means is defined by a positive displacement type oil-hydraulic rotary pump which continuously supplies a hydraulic pressure, and said pressure regulating valve returning any surplus oil supplied from said pump to a tank on the basis of a higher hydraulic pressure selected thereby, thus controlling the hydraulic pressures respectively supplied to said first and second adjusting means.

21. A stepless transmission according to claim 17, wherein said hydraulic pressure supply means includes a variable displacement pump in which the amount of oil delivered per revolution of the pump shaft can be adjusted steplessly, and displacement control means capable of controlling the discharge rate of said pump so that the delivery pressure of said pump corresponds to a control signal pressure supplied from said selecting means, thereby eliminating any surplus in the oil delivered from said pump.

* * * * *

UNITED STATES PATENT AND TRADEMARK OFFICE
CERTIFICATE OF CORRECTION

PATENT NO. : 4,798,561

DATED : January 17, 1989

INVENTOR(S) : K. HATTORI et al

It is certified that error appears in the above-identified patent and that said Letters Patent is hereby corrected as shown below:

Claim 1, line 5, change "carried" to --varied--.

Signed and Sealed this

Fourteenth Day of November, 1989

*Attest:*

JEFFREY M. SAMUELS

*Attesting Officer*     *Acting Commissioner of Patents and Trademarks*